United States Patent
Ko

(10) Patent No.: US 10,290,041 B2
(45) Date of Patent: May 14, 2019

(54) ONLINE PRODUCT RECOMMENDATION METHOD AND DEVICE

(71) Applicant: Hyun Sung Ko, Seoul (KR)

(72) Inventor: Hyun Sung Ko, Seoul (KR)

( * ) Notice: Subject to any disclaimer, the term of this patent is extended or adjusted under 35 U.S.C. 154(b) by 0 days.

(21) Appl. No.: 15/880,759

(22) Filed: Jan. 26, 2018

(65) Prior Publication Data

US 2018/0150898 A1 May 31, 2018

Related U.S. Application Data

(63) Continuation of application No. PCT/KR2016/008313, filed on Jul. 28, 2016.

(30) Foreign Application Priority Data

Sep. 18, 2015 (KR) .......... 10-2015-0132619

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06F 3/011* (2013.01); *G06F 3/048* (2013.01);
(Continued)

(58) Field of Classification Search
CPC ........... G06Q 30/06; G06Q 30/0601–30/0643; G06Q 30/08; G06F 3/011; G06F 3/048;
(Continued)

(56) References Cited

U.S. PATENT DOCUMENTS

2012/0030061 A1* 2/2012 Lu .......... G06Q 30/00
705/26.7
2013/0110679 A1* 5/2013 Spadafora .......... G06Q 30/0627
705/26.63
(Continued)

FOREIGN PATENT DOCUMENTS

KR 10079755 B1 1/2008
KR 1020100045594 A 5/2010
(Continued)

OTHER PUBLICATIONS

Getting the Look: Clothing Recognition and Segmentation for Automatic Product Suggestions in Everyday Photos. Yannis Kalantidis. Lyndon Kennedy. Li-Jia Li. Yahoo! Research. National Technical University of Athens. 2013. (Year: 2013).*

(Continued)

*Primary Examiner* — William J Allen
(74) *Attorney, Agent, or Firm* — Dinsmore & Shohl LLP; Yongsok Choi, Esq.

(57) ABSTRACT

An online product recommendation method includes constructing a database in which model-based product information on a plurality of models is stored, the model-based product information including information on body measurements of each of the plurality of models and information on at least one product purchased or recommended by the corresponding model; receiving body measurements from a user through a web page; searching the database so as to determine at least one similar model, among the plurality of models, having body measurements similar to the body measurements inputted by the user; searching the database for information on at least one product purchased or recommended by the at least one similar model; and providing information on at least one product purchased or recommended by the at least one similar model to the user through the web page.

13 Claims, 7 Drawing Sheets

(51) Int. Cl.
    *G06F 16/9535*     (2019.01)
    *G06T 13/40*     (2011.01)
    *G06T 13/20*     (2011.01)
    *G06F 3/01*     (2006.01)
    *G06F 3/048*     (2013.01)
    *G06Q 30/02*     (2012.01)

(52) U.S. Cl.
    CPC ..... *G06F 16/9535* (2019.01); *G06Q 30/0282* (2013.01); *G06Q 30/0623* (2013.01); *G06Q 30/0627* (2013.01); *G06Q 30/0643* (2013.01); *G06T 13/20* (2013.01); *G06T 13/40* (2013.01)

(58) Field of Classification Search
    CPC ......... G06T 13/00; G06T 13/20; G06T 13/40; G06T 13/80
    See application file for complete search history.

(56) References Cited

U.S. PATENT DOCUMENTS

2013/0173344 A1* 7/2013 Kundagrami .......... G06Q 40/02
                                                    705/7.32
2015/0186977 A1* 7/2015 Leonard ............. G06Q 30/0631
                                                    705/26.7
2015/0262282 A1* 9/2015 Walti ................. G06Q 30/0631
                                                    705/26.7
2016/0292765 A1* 10/2016 Jin ..................... G06Q 30/0629

FOREIGN PATENT DOCUMENTS

| KR | 1020100048733 A | 5/2010 |
| KR | 1020130027801 A | 3/2013 |
| KR | 1020140006294 A | 1/2014 |

OTHER PUBLICATIONS

First Korean Office Action dated Oct. 7, 2015.
English translation of Korean Office Action dated Oct. 7, 2015.
Second Korean Office Action dated Feb. 5, 2016.
English translation of Korean Office Action dated Feb. 5, 2016.
International Search Report dated Oct. 31, 2016.
Second Korean Office Action dated Feb. 5, 2016 pertaining to Korean Patent Application 10-2015-0132619 filed Sep. 18, 2015, 3 pgs.
English Translation of Second Korean Office Action dated Feb. 5, 2016 pertaining to Korean Patent Application 10-2015-0132619 filed Sep. 18, 2015, 2 pgs.

* cited by examiner

| user ID | height | weight | waist size | arm length | leg length | chest size | shoulder width |
|---|---|---|---|---|---|---|---|
| | cm | kg | inch | cm | cm | cm | cm |
| zeep | 170 | 70 | 34 | 68 | 77 | 95 | 46 |
| idoido | 165 | 65 | 28 | null | 75.4 | 90 | 45 |
| acventure1 | 178 | 78 | 35 | 68 | 81.3 | 98 | 47 |
| addd123 | 168 | 80 | 38 | 63 | null | 93 | 50 |
| happyboy | 181 | 90 | 34 | null | 82.7 | 100 | 48 |
| goodday2 | 171 | 69 | 34.5 | 68 | 77.5 | 98 | 46 |

FIG. 4

| user ID | height percentile(%) | weight percentile(%) | waist size percentile(%) | arm length percentile(%) | leg length percentile(%) | chest size percentile(%) | shoulder width percentile(%) |
|---|---|---|---|---|---|---|---|
| zeep | 10 | 10 | 10 | 10 | 10 | 10 | 10 |
| idoido | 20 | 20 | 20 | null | 15 | 20 | 12 |
| acventure1 | 3 | 7 | 7 | 10 | 5 | 7 | 9 |
| addd123 | 15 | 5 | 2 | 20 | null | 15 | 5 |
| happyboy | 2 | 2 | 10 | null | 2 | 5 | 8 |
| goodday2 | 9 | 12 | 8 | 10 | 9 | 7 | 10 |

FIG. 5

ONLINE PRODUCT RECOMMENDATION METHOD AND DEVICE

CROSS-REFERENCE TO RELATED APPLICATIONS

This application is a continuation application of PCT/KR2016/008313 filed on Jul. 28, 2016 which claims priority under 35 U.S.C. § 119 to Korean Patent Application No. 10-2015-0132619, filed on Sep. 18, 2015, the contents of which are herein incorporated by reference in their entireties.

BACKGROUND

1. Field

Exemplary embodiments of the present inventive concept relate to an information providing system through an internet. More particularly, exemplary embodiments of the present inventive concept relate to a method and an apparatus for recommending an online product.

2. Description of the Related Art

As an information technology makes rapid progress, daily lifestyle is changing. For example, when people buy products, uses of online shopping malls are broadly expanded. Thus, markets related to the online shopping are in strong growth in the world.

A consumer contacts an online shopping mall through an internet using a terminal (e.g. a computer) to purchase a product at the online shopping mall. When the consumer contacts the online shopping mall using the terminal, the online shopping mall shows products of the online shopping mall to the terminal. Then the consumer searches the product considering a specification, a function, a price, a condition of sale of the product from a database constructed at the online shopping mall. In addition, a comparison online shopping mall may provide information of various shopping malls so that a consumer may choose a cheapest shopping mall where sells a required product.

The online shopping malls selling clothes and shoes which are desirable to be worn by a consumer increase geometrically. The online shopping malls selling the clothes and the shoes may provide an easy way of purchase. However, information regarding sizes of the clothes and the shoes may be insufficient in the online shopping malls selling the clothes and the shoes. The clothes and the shoes may be experience goods so that the consumer has difficulties in purchasing the products without wearing the clothes and the shoes.

A standard for the size of the clothes does not exist and the size of the consumer may vary according to clothes and sellers. Therefore, the consumer generally has difficulties in purchasing the clothes and the shoes at the online shopping mall except that the consumer is sure of the size such as the repurchase of the same clothes. In addition, although the consumer visits an offline shop, the consumer may not be sure of the proper size when the consumer wants to purchase clothes having different styles.

SUMMARY

Exemplary embodiments of the present inventive concept provide a method and an apparatus of recommending an online product enhancing convenience of online purchase by recommending a product having a right size to a user which wants to purchase the online product.

Exemplary embodiments of the present inventive concept also provide a method and an apparatus of recommending an online product helping a user to purchase a product in size and matched well with the user by providing purchase information of another user which has a body size similar to the user to the user.

Exemplary embodiments of the present inventive concept also provide a method and an apparatus of recommending an online product helping a user to purchase a product by providing an image of another user which has a body size similar to the user wearing the product to the user.

According to the method and the apparatus of recommending an online product of the present inventive concept, a product having a right size is recommended to a user which wants to purchase the online product so that the convenience of online purchase may be enhanced.

According to the method and the apparatus of recommending an online product of the present inventive concept, purchase information of another user which has a body size similar to the user is provided to the user so that the user may easily purchase the product in size and matched well with the user.

According to the method and the apparatus of recommending an online product of the present inventive concept, an image of another user which has a body size similar to a user wearing the product to the user so that the user may easily purchase the product.

DETAILED DESCRIPTION OF THE DRAWINGS

The above and other features and advantages of the present inventive concept will become more apparent by describing in detailed exemplary embodiments thereof with reference to the accompanying drawings, in which:

FIGS. 4 and 5 are tables illustrating the user information according to an exemplary embodiment of the present inventive concept.

DETAILED DESCRIPTION

Figure 1:
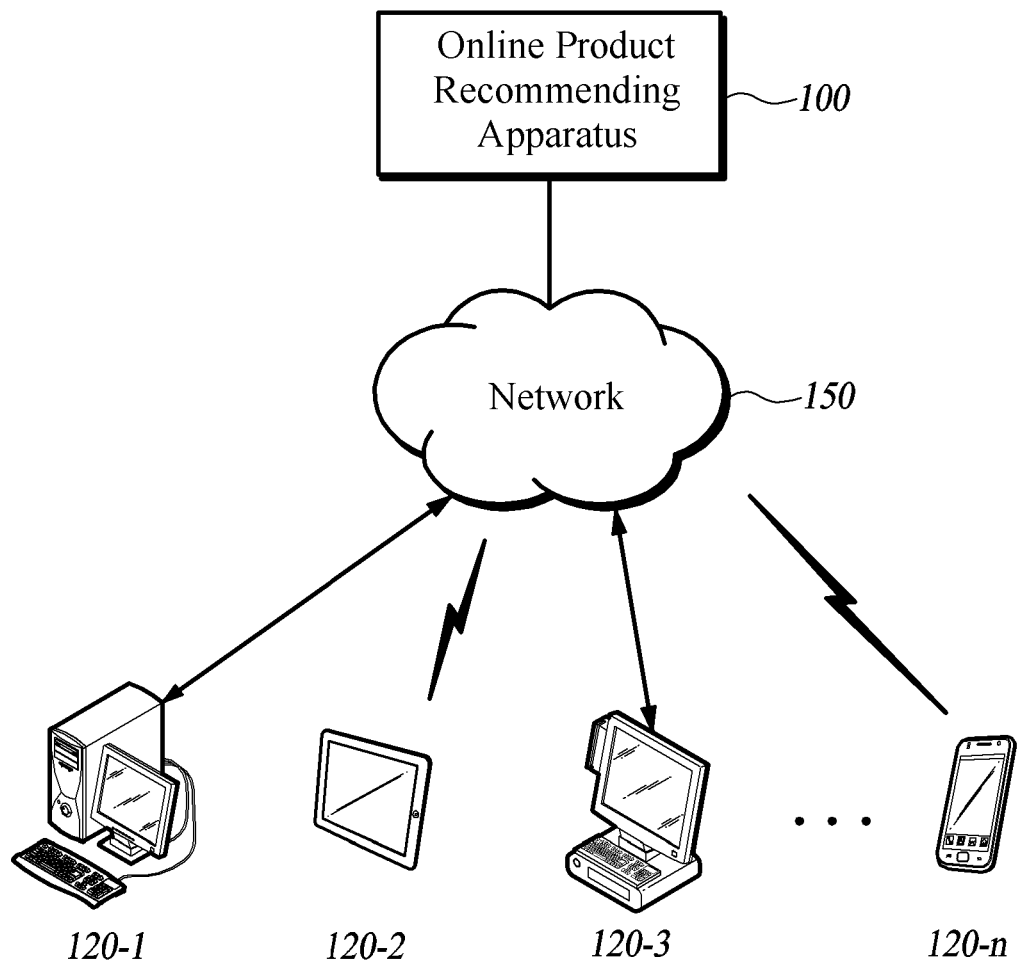
FIG. 1 is a network diagram illustrating connections between an online product recommending apparatus according to an exemplary embodiment of the present inventive concept and a plurality of client terminals.

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set forth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

FIG. 1 is a network diagram illustrating connections between an online product recommending apparatus according to an exemplary embodiment of the present inventive concept and a plurality of client terminals.

Referring to FIG. 1, a user may contact the online product recommending apparatus 100 through a communication network 150 using the client terminals 120-1 to 120-n to search information of an online product. The user may purchase the online product using web based support services provided by the online product recommending apparatus 100. In an exemplary embodiment, the client terminal 120-1 to 120-n may include a desktop PC, a tablet PC, a smart phone, a laptop computer, an electronic notepad, a workstation and so on which have a wireless LAN module and/or a wired LAN module. In an exemplary embodiment, the client terminal 120-1 to 120-n may include a web browser and may be configured to access Internet using the web browser to browse and search various web pages. The network 150 may include the Internet. The network 150 may selectively include a wireless LAN such as a WiFi and 3G/4G wireless communication networks.

Figure 2:
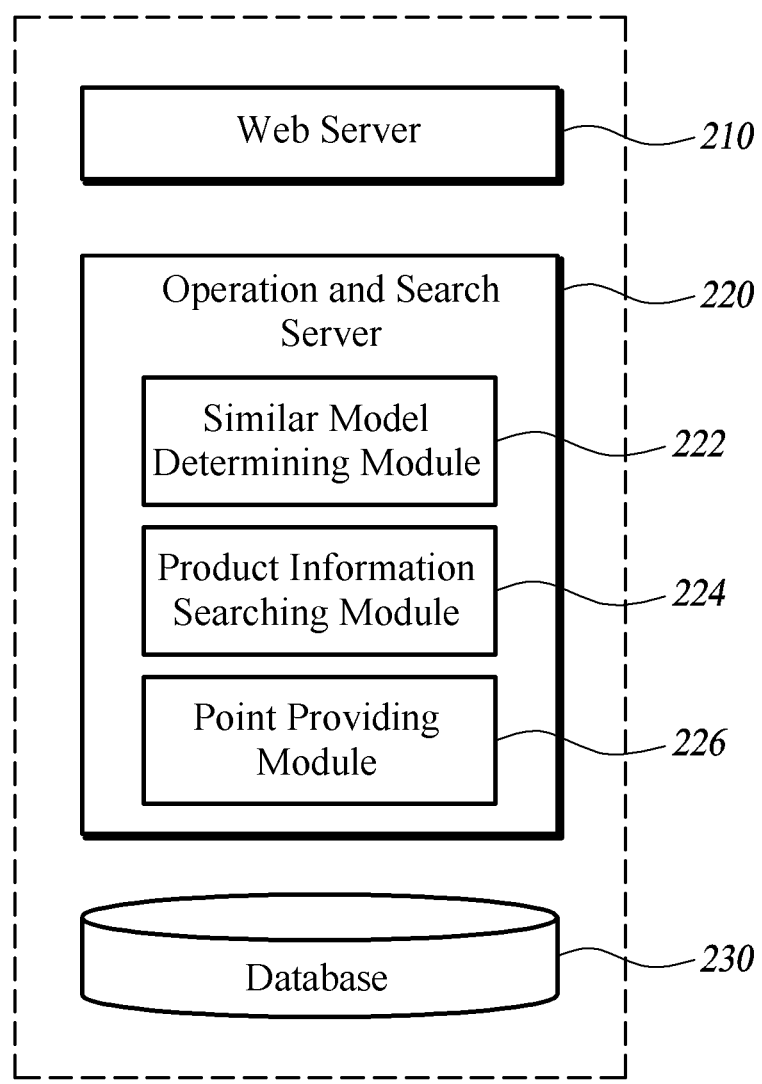
FIG. 2 is a block diagram illustrating an exemplary embodiment of a structure of the online product recommending apparatus of FIG. 1.

FIG. 2 is a block diagram illustrating an exemplary embodiment of a structure of the online product recommending apparatus of FIG. 1. Referring to FIG. 2, the online product recommending apparatus 100 according to an exemplary embodiment of the present inventive concept may include a web server 210, an operation and search server 220 and a database 230. The elements illustrated in FIG. 2 do not reflect all of the functions so that the online product recommending apparatus 100 may include further elements than the elements in FIG. 2. In addition, all of the elements in FIG. 2 are not essential elements so that one or some of the elements in FIG. 2 may be omitted.

An online product recommending apparatus 100 according to an exemplary embodiment of the present inventive concept may include web server 210. In an exemplary embodiment, the web server 210 may be implemented as a processor, a personal computer, or a workstation having a mass storage device. In general, the mass storage devices may include disk drives, magnetic disks, optical disks, or other suitable storage devices. The web server 210 may be configured to provide at least one web page to the client terminal 120-1 to 120-n in response to the connection thereto by the client terminal.

An online product recommending apparatus 100 according to an exemplary embodiment of the present inventive concept may include an operation and search server 220. In an exemplary embodiment, the operation and search server 220 may include a similar model determining module 222, a product information searching module 224 and a point providing module 226 to control recommendation of the online product. However, the structure of the operation and search server 220 is not limited thereto.

In an exemplary embodiment, the operation and search server 220 may include a similar model determining module 222. In an exemplary embodiment, the similar model determining module 222 may be configured to determine another user having a body size similar to a body size of the present user as a similar model of the present user. In an exemplary embodiment, the similar model determining module 222 may be configured to search the database based on the body size inputted by the present user and determine at least one similar model having a body size similar to the body size of the present user. Herein, the body size may include at least one of a height, a weight, a waist size, an arm length, a leg length, a chest size, a shoulder width and a calf size.

In an exemplary embodiment, the similar model determining module 222 may be configured to determine that the body size of the present user is similar to the body size of a plurality of models based on at least one of the above size items of the present user and at least one of the above size items of the plurality of the models to determine at least one similar model of the present user. In an exemplary embodiment, the similar model determining module 222 may be configured to determine at least one item similar model having a size difference for at least one of the corresponding body size items between the present user and the model equal to or less than a predetermined value. The similar model determining module 222 may be configured to determine at least one similar model which is determined as the item similar models for a plurality of items which are greater than a predetermined number.

In an exemplary embodiment, the similar model determining module 222 may be configured to determine at least one body part similar model having a percentile difference for at least one of corresponding body part size distribution between the present user and the model equal to or less than a predetermined value. The similar model determining module 222 may be configured to determine at least one similar model which is determined as the body part similar models for a plurality of body parts which are greater than a predetermined number.

In an exemplary embodiment, the operation and search server 220 may further include a product information searching module 224. In an exemplary embodiment, the product information searching module 224 may be configured to search the model based product information based on the information of the similar model having the body size similar to the body size of the present user. In an exemplary embodiment, the product information searching module 224 may be configured to search the model based product information based on at least one similar model. For example, the model based product information may include the information of at least one product which is purchased by the similar model. In an exemplary embodiment, information of at least one product which is purchased by the similar model may include at least one of a name of the product, a price of the product, a size of the product, an image of the product, a review for at least one of the products and an image of the similar model wearing at least one of the products.

In an exemplary embodiment, the operation and search server 220 may further include a point providing module 226. In an exemplary embodiment, the point providing module 226 may be configured to provide a point to the similar model, when the present user purchases a product after watching the image of the similar model wearing the product which is uploaded by the similar model. In an exemplary embodiment, the point providing module 226 may be configured to provide the point to the similar model in response to purchase of the present user who watches the image of the similar model wearing the product which is uploaded by the similar model.

In the present exemplary embodiment explained above, the web server 210 and the operation and search server 220 may include at least one of ASICs (application specific integrated circuits), DSPs (digital signal processors), DSPDs (digital signal processing devices), PLDs (programmable logic devices), FPGAs (field programmable gate arrays), processors, controllers, micro-controllers and microprocessors on a hardware side. The exemplary embodiments including processes, steps or functions may be implemented by a firmware/software module executable at least one function or operation on a hardware platform. The software module may be implemented by a software application which is written in a proper programming language. The software module may be stored in the web server 210 and the operation and search server 220 or the software module may be distributed to be stored in a storage and the web server 210 and the operation and search server 220. The software module may be executed by the web server 210 and the operation and search server 220.

The online product recommending apparatus 100 according to an exemplary embodiment of the present inventive concept may further include a communication part (not shown in figures). The communication part may include a hardware and/or a firmware to support the online product recommending apparatus 100 to communicate with a user/client group 120-1 to 120-n or another entity (not shown in figures) on a network.

The online product recommending apparatus 100 according to an exemplary embodiment of the present inventive concept may further include a database 230. The database 230 may be connected to the web server 210 and the operation and search server 220. In an exemplary embodiment, the database 230 may store information of at least one user. The user information may include a user ID, the body size, the information of the product purchased by the user and an image of the user wearing the product which is uploaded by the user. In an exemplary embodiment, the body size of the user may include at least one of a height, a weight, a waist size, an arm length, a leg length, a chest size and a shoulder width. In an exemplary embodiment, the body size of the user may further include at least one of the percentile of the body part size distribution.

In an exemplary embodiment, the database 230 may be implemented using a disk driver, a magnetic driver, an optical disk or other storage apparatuses. In an exemplary embodiment, the online product recommending apparatus 100 may be operated using a web storage storing data on Internet. The web storage may be independent from the database 230 or be connected or linked with the database 230.

Figure 3:
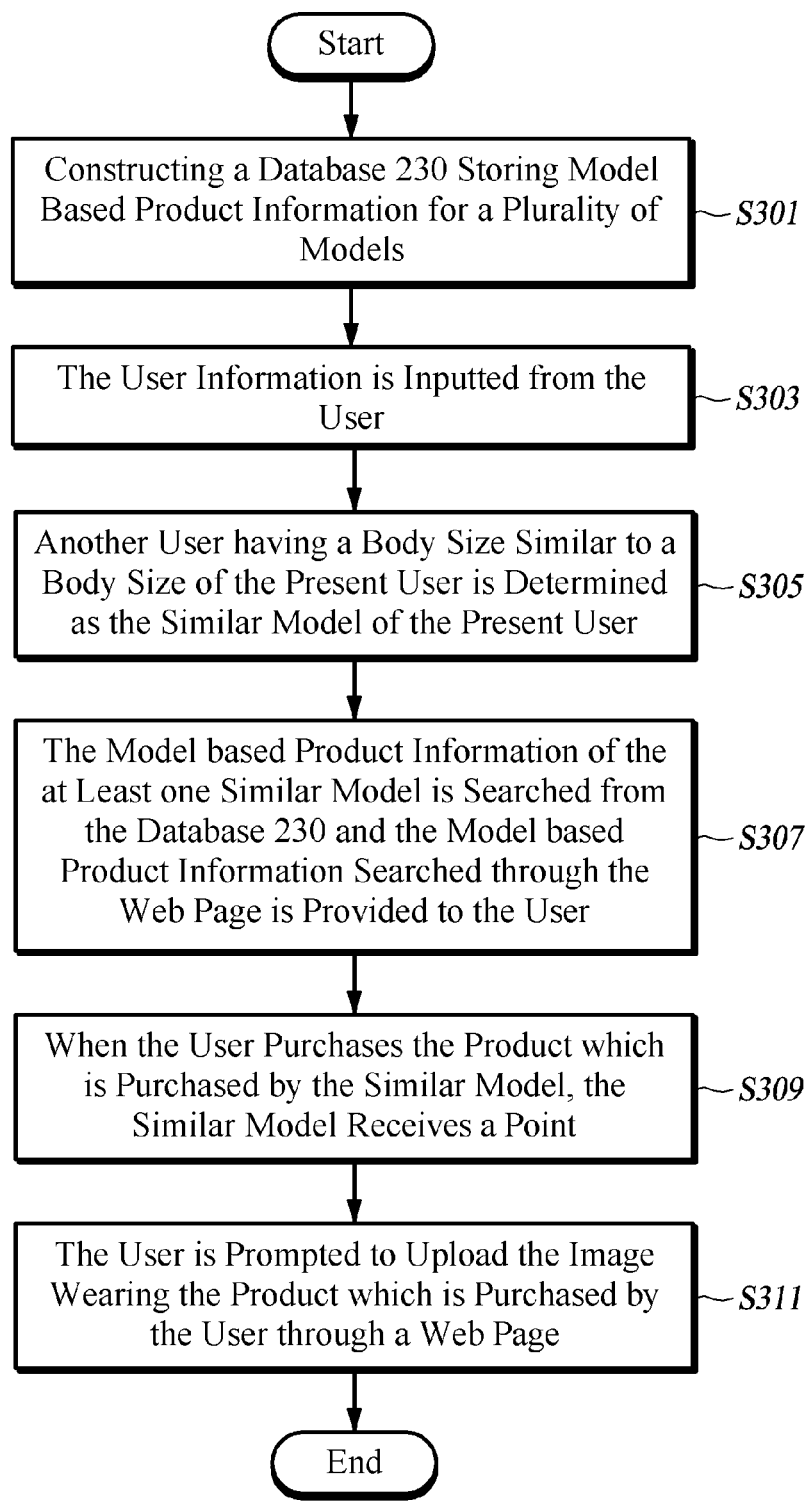
FIG. 3 is a flowchart illustrating a method of recommending the online product according to an exemplary embodiment of the present inventive concept.

FIG. 3 is a flowchart illustrating a method of recommending the online product according to an exemplary embodiment of the present inventive concept. FIGS. 4 and 5 are tables illustrating the user information according to an exemplary embodiment of the present inventive concept.

The method according to an exemplary embodiment of the present inventive concept starts from a step S301 of constructing a database 230 storing model based product information for a plurality of models. Herein, the model based product information may include respective body sizes of the models and information of the product purchased by the model. For example, the product information of a model A may include a user ID, a body size—a height (170 cm), a weight (70 kg), a waist size (32 inches), an arm length (null), a leg length (90 cm), a chest size (null) and a shoulder width (48 cm)—, and the information of the product (shorts) purchased by the model A including the name of the product (summer shorts), the price of the product (2,000 won), the size of the product (32 inches), the image of the product and the image of the model A wearing the product.

In a step 303, the user information is inputted from the user by a web page or a mobile page. In an exemplary embodiment, the user information may include the user ID, the body size, the information of the product purchased by the user, the image of the user wearing the product which is uploaded by the user. The body size of the user may include at least one of the height, the weight, the waist size, the arm length, the leg length, the chest size and the shoulder width. In an exemplary embodiment, the body size of the user may further include at least one of the percentile of the body part size distribution.

In an exemplary embodiment, the body size of the user may be measured by a three-dimensional full body scanner. A human body shape may be accurately analyzed by the three-dimensional full body scanner. In addition, a portable three-dimensional full body scanner having a small size and a light weight has been developed. Accordingly, the body of the user may be scanned to measure the body size of the user by the three dimensional full body scanner.

In a step of 305, another user having a body size similar to a body size of the present user is determined as the similar model of the present user among the plurality of models by searching the database 230 according to an exemplary embodiment of the present inventive concept. In an exemplary embodiment, it is determined that the body size of the present user is similar to the body size of a plurality of models based on at least one of the size items of the present user and at least one of the size items of the plurality of the models to determine at least one similar model of the present user. In an exemplary embodiment, at least one model having a size difference for at least one of the corresponding body size items between the present user and the model equal to or less than a predetermined value is determined as an item similar model. When at least one model is determined as the item similar models for a plurality of items which are greater than a predetermined number, the model is determined as the similar model.

For example, referring to FIG. 4, the body size of the user having the user ID of "zeep" includes the height (170 cm), the weight (70 kg), the waist size (34 inches), the arm length (68 cm), the leg length (77 cm), a chest size (95 cm) and a shoulder width (46 cm). The body size items of the user having the user ID of "zeep" are compared to the body size items of the plurality of other models. For example, the predetermined value of the size difference between the body size items of the user and the model may be 1%. In addition, the predetermined number of the item similar models to be determined as the similar model may be three. In this case, similar ranges of respective body size items of the user having the user ID of "zeep" may be 168.3 cm to 171.7 cm for the height, 69.3 kg to 70.7 kg for the weight, 33.7 inches to 34.3 inches for the waist size, 67.3 cm to 68.7 cm for the arm length, 76.2 cm to 77.8 cm for the leg length, 94 cm to 96 cm for the chest size, 45.5 cm to 46.5 cm for the shoulder width. The models having the user ID of "idolido" and "addd123" do not have the body size item in the similar ranges. The arm length of the model having the user ID of "adventure1" are similar to the arm length and the waist size of the present user. The waist size of the model having the user ID of happyboy" are similar to the arm length and the waist size of the present user. The body size of the model having the user ID of "goodday2" includes the height (171 cm), the weight (69 kg), the waist size (34.5 inches), the arm length (68 cm), the leg length (77.5 cm), a chest size (98 cm) and a shoulder width (46 cm). Four body size items of the height, the arm length, the leg length and the shoulder width of the model having the user ID of "goodday2" are similar to the height, the arm length, the leg length and the shoulder width of the present user having the user ID of "zeep" so that the model having the user ID of "goodday2" may be determined as the similar model of the present user.

In an exemplary embodiment, the percentile of the user and the percentiles of the models in the body part size distribution may be used to determine the similarity of the body size items of the user and the plurality of models. The percentile in the body part size distribution means the percentile of the body part size from the top among the entire populations having the same gender. According to the present exemplary embodiment, the model having a percentile difference for at least one of corresponding body part size distribution between the present user and the model equal to or less than a predetermined value may be determined as the body part similar model. The model which is determined as the body part similar models for a plurality of body parts which are greater than a predetermined number may be determined as the similar model.

For example, when the percentile of the height of the user who is male is 10%, the height of the user is 10% from the top among the entire male populations. For example, referring to FIG. 5, the percentiles of the body parts of the user having the user ID of "zeep" are relatively 10% for the height, 10% for the weight, 10% for the waist size, 10% for the arm length, 10% for the leg length, 10% for the chest size and 10% for the shoulder width. For example, the predetermined value of the percentile difference in the body part size distribution between the body parts of the user and the model may be 3%. In addition, the predetermined number of the body part similar models to be determined as the similar model may be three. The percentile of the body parts of the present user having the user ID of "zeep" is compared to the percentile of the body parts of the models. The percentile of the shoulder width of the model having the user ID of "idolido" is similar to the percentile of the shoulder width of the present user. The percentiles of two body parts of the weight and the shoulder width of the model having the user ID of "adventure1" are similar to the percentiles of the weight and the shoulder width of the present user. The model having the user ID of "addd123" does not have the body part in the percentile difference of 3% from the present user. The percentiles of two body parts of the waist size and the shoulder width of the model having the user ID of "happyboy" are similar to the percentiles of the waist size and the shoulder width of the present user. The percentiles of seven body parts of the height, the weight, the waist size, the arm length, the leg length, the chest size and the shoulder width of the model having the user ID of "goodday2" are similar to the percentiles of the height, the weight, the waist size, the arm length, the leg length, the chest size and the shoulder width of the present user. Thus, the model having the user ID of "goodday2" may be determined as the similar model.

In a step of 307, the model based product information of the at least one similar model is searched from the database 230 and the model based product information searched through the web page is provided to the user. In an exemplary embodiment, information of at least one product which is purchased by the similar model may include at least one of a name of the product, a price of the product, a size of the product, an image of the product, a review for at least one of the products and an image of the similar model wearing at least one of the products.

Figure 6A:
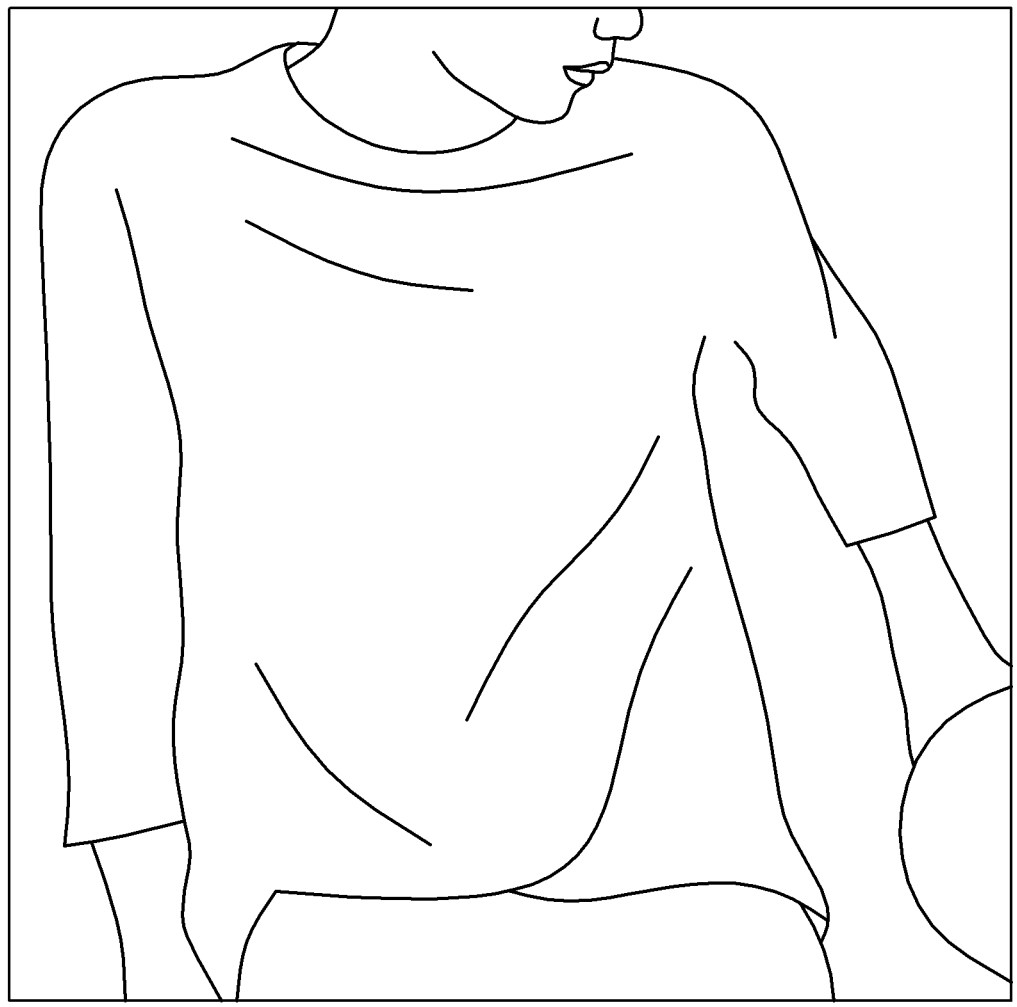
FIGS. 6A and 6B are images illustrating the similar model wearing the product.
Figure 6B:
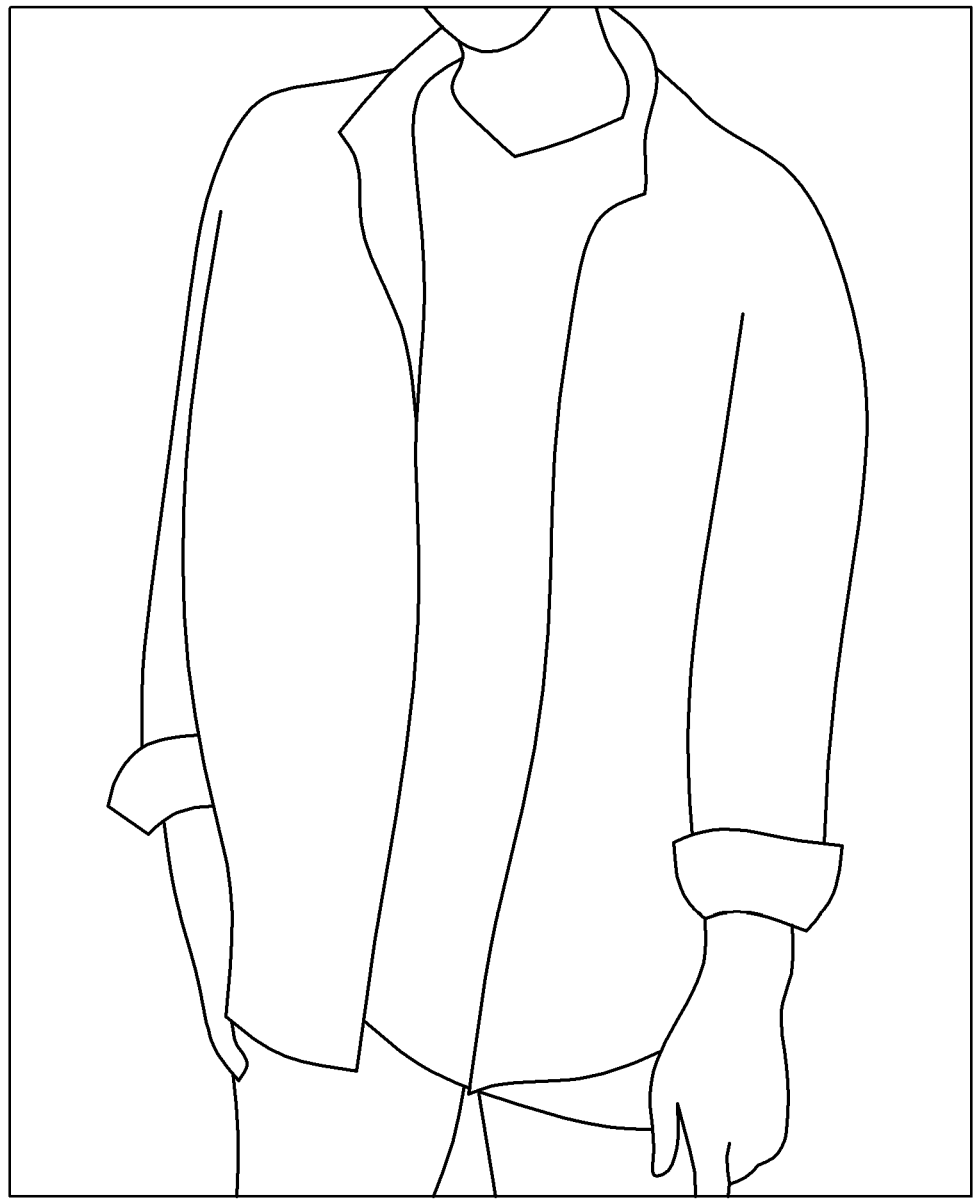

FIGS. 6A and 6B are images illustrating the similar model wearing the product. For example, the similar model having the user ID of "goodday2" of the present user having the user ID of "zeep" purchased white T-shirts and shirts and uploaded the image of the similar model having the user ID of "goodday2" wearing the white T-shirts and the shirts. The image of the similar model having the user ID of "goodday2" wearing the white T-shirts and the shirts may be provided to the present user having the user ID of "zeep."

In a step of S309, when the user purchases the product which is purchased by the similar model, the similar model receives a point. In a step of S311, the user is prompted to upload the image wearing the product which is purchased by the user through a web page. Herein, for example, the "prompting" may include guiding the user to upload the image wearing the product which is purchased by the user through the webpage, generating a popup window to upload the image wearing the product which is purchased by the user or the like. When the user uploads the image wearing the purchased product, the model based product information is updated based on the body size information of the user and the image of the user wearing the purchased product and the model based product information may be stored in the database 230 so that the database 230 may be updated.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein. In addition, the various technical features in the present inventive concept may be implemented by hardware, software, or a combination of hardware and software. Accordingly, a specific part of the method of analyzing the hazard of the control software driving system may be formed as at least one of computer programs executable by a general purpose microprocessor, a dedicated microprocessor and a microcontroller. The computer program according to the present exemplary embodiments may be stored in one of storing mediums including a non volatile memory such as EPROM, EEPROM and a flash memory device, an internal hard disk and a detachable disk, a magnetic disk, a magnetooptic disk and a CD disk. In addition, the program codes may be written in an assembly language or a machine language. The program codes may be transmitted by one of transmitting mediums including an electric wiring, a cable, an optical fiber and so on.

What is claimed is:

1. A method of recommending an online product executed in an online product recommending system, the method comprising:
    constructing a database storing model based product information for each model of a plurality of models, the model based product information including for each model, information about body sizes of the plurality of the models and information about at least one product purchased or recommended by a user of a respective model;
    receiving a body size of a user through a web page;
    determining at least one similar model having the body size similar to the body size of the user among the plurality of the models by searching the database;
    searching information about at least one product purchased or recommended by the at least one similar model;
    providing the information about at least one product purchased or recommended by the at least one similar model through the web page;
    displaying an image of the similar model wearing the at least one product purchased or recommended by the similar model in response to searching information about the at least one product purchased or recommended by the at least one similar model; and
    assigning, by the online product recommending system, a point to the at least one similar model when the user purchases the at least one product purchased or recommended by the at least one similar model through the web page.

2. The method of claim 1, wherein the body size inputted by the user and the respective body sizes of the plurality of the models include at least one of body size items including a height, a weight, a waist size, an arm length, a leg length, a chest size, and a shoulder width, wherein the determining at least one similar model having the body size similar to the body size of the user by searching the database comprises:
    determining whether the body size of the user and the respective body sizes of the plurality of the models are similar to each other based on at least one body size item of the user and at least one respective body size items of the plurality of the models; and
    determining at least one of the similar models based on the determination on whether the body size of the user and the respective body sizes of the plurality of the models are similar to each other.

3. The method of claim 2, wherein the determining whether the body size of the user and the respective body sizes of the plurality of the models are similar to each other comprises determining, as item similar models among the plurality of the models, at least one model having body size items, a difference between one of body size items of the at least one model and a corresponding body size item of the user being equal to or less than a predetermined value, and
    the determining at least one similar model based on the determination on whether the body size of the user and the respective body sizes of the plurality of the models are similar to each other comprises determining, as the at least one similar model, at least one model which is determined as the item similar model with respect to a plurality of body size items the number of which is greater than a predetermined number.

4. The method of claim 1, wherein the information about at least one product purchased or recommended by the similar model includes at least one of a name of the product, a price of the product, a size of the product, an image of the product, a review for the product, and an image of the similar model wearing the product.

5. The method of claim 1, further comprising:
    prompting the user to upload an image of the user wearing a product purchased by the user through the web page; and
    updating the model based product information based on information about the body size of the user and the image of the user wearing the product purchased by the user and storing the model based product information in the database when the user uploads the image wearing the product purchased by the user.

6. The method of claim 1, wherein the body size of the user and the respective body sizes of the plurality of the models further include a percentile in at least one body part size distribution,
    wherein the determining whether the body size of the user and the respective body sizes of the plurality of the models are similar to each other comprises determining, as body part similar models among the plurality of the models, at least one model, a difference between the percentile of a body size of the user and the percentile of a corresponding body size of the at least one model being equal to or less than a predetermined value, and
    the determining at least one similar model based on the determination on whether the body size of the user and the respective body sizes of the plurality of the models are similar to each other comprises determining, as the at least one similar model, at least one model which is determined as the body part similar models with respect to a plurality of body parts the number of which is greater than a predetermined number.

7. An online product recommending apparatus comprising:

a database configured to store model based product information for each model of a plurality of models, the model based product information including, for each model, information about body sizes of the plurality of the models and information about at least one product purchased or recommended by a user of a respective model;

a web server configured to receive a body size of a user from the user through a web page;

an operation and search server comprising a similar model determining module configured to determine at least one similar model having the body size similar to the body size of the user among the plurality of the models by searching the database; and a product information searching module configured to search information about at least one product purchased or recommended by the at least one similar model, and display an image of the similar model wearing the at least one product purchased or recommended by the similar model in response to searching information about the at least one product purchased or recommended by the at least one similar model, wherein the web server is further configured to provide the information about at least one product purchased or recommended by the at least one similar model through the web page, and the operation and search server further comprises point providing module configured to assign a point to the at least one similar model when the user purchases the at least one product purchased or recommended by the at least one similar model through the web page.

8. The online product recommending apparatus of claim 7, wherein the body size inputted by the user and the respective body sizes of the plurality of the models include at least one of body size items including a height, a weight, a waist size, an arm length, a leg length, a chest size, and a shoulder width, wherein the similar model determining module is configured to:

determine whether the body size of the user and the respective body sizes of the plurality of the models are similar to each other based on at least one body size item of the user and at least one respective body size items of the plurality of models; and determine at least one of the similar models based on the determination on whether the body size of the user and the respective body sizes of the plurality of models are similar to each other.

9. The online product recommending apparatus of claim 8, wherein the similar model determining module is configured to determine, as item similar models among the plurality of the models, at least one model having body size items, a difference between one of the body size items of the at least one model and a corresponding body size item of the user being equal to or less than a predetermined value, and the similar model determining module is further configured to determine, as the at least one similar model, at least one model which is determined as the item similar model with respect to a plurality of body size items the number of which is greater than a predetermined number.

10. The online product recommending apparatus of claim 7, wherein the information about at least one product purchased or recommended by the similar model includes at least one of a name of the product, a price of the product, a size of the product, an image of the product, a review for the product, and an image of the similar model wearing the product.

11. The online product recommending apparatus of claim 7, wherein the body size of the user and the respective body sizes of the plurality of models further include a percentile in at least one body part size distribution, wherein the similar model determining module is configured to determine, as body part similar models among the plurality of the models, a difference the percentile of a body size of the user and the percentile of a corresponding body size of the at least one model being equal to or less than a predetermined value, and the similar model determining module is further configured to determine, as the at least one similar model, at least one model which is determined as the body part similar models with respect to a plurality of body parts the number of which is greater than a predetermined number.

12. A method of recommending an online product executed in an online product recommending system, the method comprising:

constructing a database storing model based product information for each model of a plurality of models, the model based product information including, for each model, information about body sizes of the plurality of the models and information about at least one product purchased or recommended by a user of a respective model, and the information about at least one product purchased or recommended by the user of the respective model including an image of the model wearing at least one product purchased or recommended by the user of the respective model;

receiving a body size of a user through a web page;

displaying a plurality of products through the web page;

when the user selects one of the plurality of the products as an interest product through the web page, determining, among the plurality of the models, at least one similar model who purchased or recommended the selected interest product and has the body size similar to the body size of the user by searching the database;

searching an image of the at least one similar model wearing the interest product from the database;

providing the searched image of the at least one similar model wearing the interest product to the user through the web page; and assigning, by the online product recommending system, a point to the at least one similar model when the user purchases the interest product through the web page.

13. The method of claim 12, wherein the selecting one of the plurality of the products as the interest product by the user through the web page comprises clicking the interest product by the user.

* * * * *